May 7, 1940.　　　T. L. FAWICK　　　2,199,624
FLEXIBLE COUPLING
Filed March 26, 1938　　2 Sheets-Sheet 1
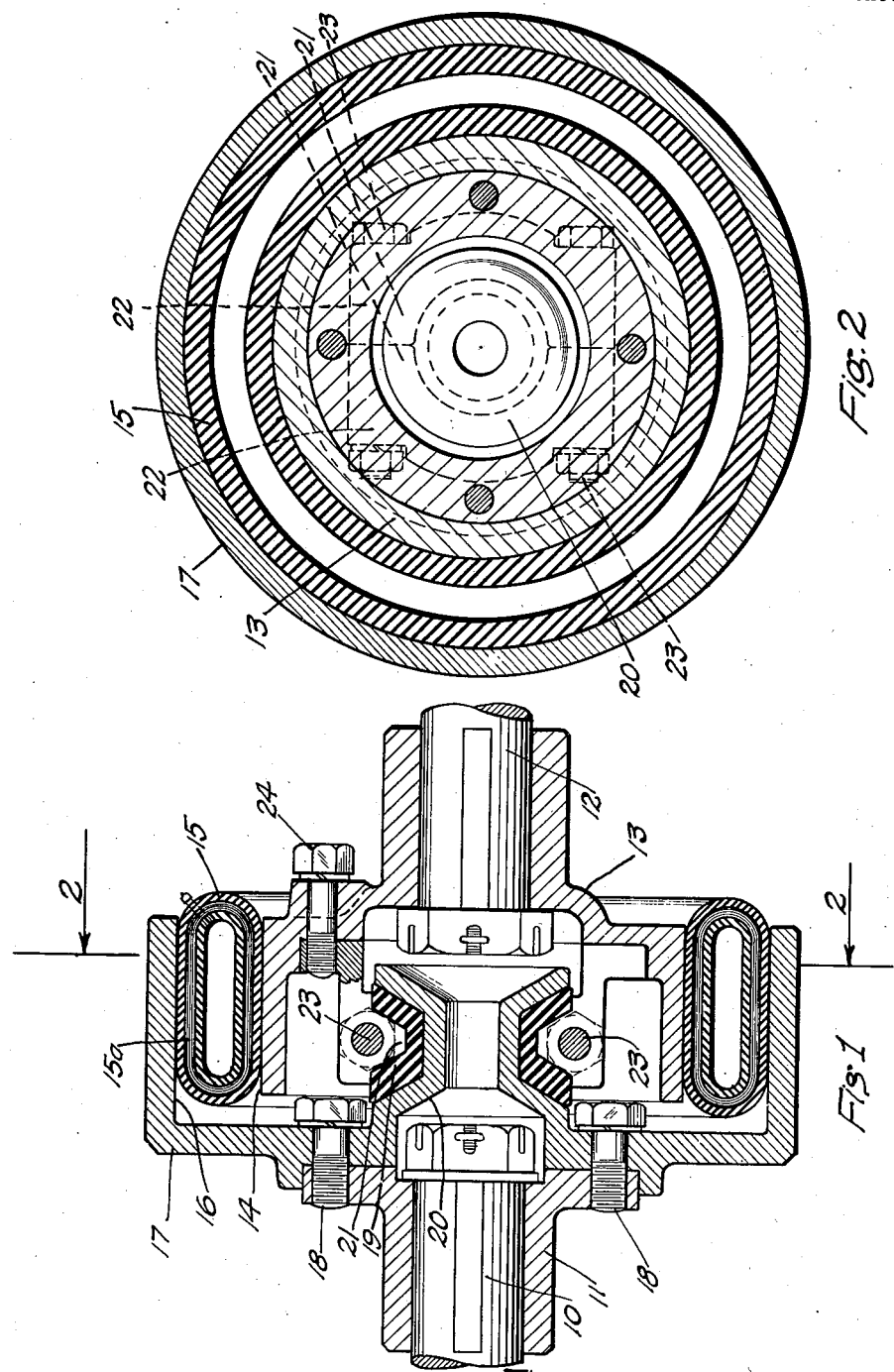
Thomas L. Fawick INVENTOR
BY Willard D. Eskin
ATTORNEY May 7, 1940.  T. L. FAWICK  2,199,624
FLEXIBLE COUPLING
Filed March 26, 1938   2 Sheets-Sheet 2

INVENTOR
Thomas L. Fawick
BY
Willard D. Eskin
ATTORNEY

Patented May 7, 1940

2,199,624

UNITED STATES PATENT OFFICE 2,199,624

FLEXIBLE COUPLING

Thomas L. Fawick, Akron, Ohio

Application March 26, 1938, Serial No. 198,259

12 Claims. (Cl. 64—11)

This invention relates to flexible couplings and is of especial advantage for coupling one shaft to another shaft that is required to sustain thrust, as in the case of propeller shafts for boats, for example.

In my United States Patent No. 2,111,422 of March 15, 1937, and in my copending application Serial No. 99,421, filed September 4, 1936, and now matured into Patent No. 2,141,645, of December 27, 1938, I have described and more broadly claimed torque-transmitting assemblies including an annular torque-transmitting fluid-container having flexible walls and in some of its aspects the present invention is in the nature of an improvement upon the inventions of the said patent and the said application.

When the driving shaft is connected to the driven shaft through an element that is highly deformable for compensation of shaft misalignment, as in the case of the fluid containers above mentioned, such an element may be excessively deformed by heavy thrust required to be sustained by the assembly, as in the case of propeller shafts.

The chief objects of this invention are to avoid such excessive deformation; to avoid it without greatly reducing the flexibility of the coupling; to avoid it without greatly reducing the power-transmission efficiency of the coupling; to lessen the impact effect of sudden application of a thrust load; to prolong the life of the deformable torque-transmitting element; and to provide some or all of these advantages in a simple and economical structure.

Of the accompanying drawings:

Fig. 1 is a longitudinal middle section of a flexible-coupling assembly embodying my invention in its preferred form as adapted for certain types of installations.

Fig. 2 is a section on line 2—2 of Fig. 1.

Figure 5:
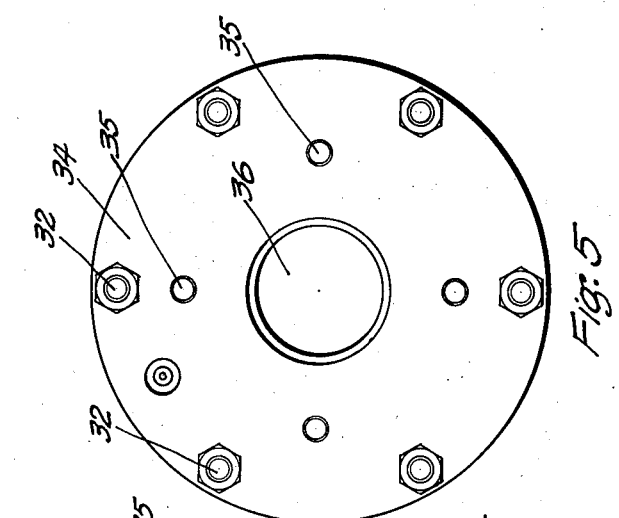
Fig. 5 is an elevation of the same from the right of Fig. 3.

Referring first to the assembly shown in Figs. 1 and 2, the assembly there shown comprises a driving shaft 10 having keyed upon it a flange member or head 11, and a driven propeller shaft 12 having keyed upon it a head 13 formed with a cylindrical outer surface 14 embraced by an annular, flexible, torque-transmitting fluid-container 15 which is held to an oblong cross-sectional form by the inner cylindrical face 16 of a bell-shaped member 17 which is secured to the head 11 of the shaft 10 by bolts 18, 18.

For transmitting the propeller thrust from the propeller shaft 12 to the driving shaft 10 without excessive deformation of or strain upon the fluid-container 15, a rubber thrust-receiving and cushioning ring 19, preferably of small inner and outer diameter to avoid stiffening of the assembly against shaft misalignment, is mounted in a position substantially coaxial with the shafts.

In this embodiment of Figs. 1 and 2 the rubber ring 19 is shown as being of V-form in cross-section, for sustaining and cushioning the thrust in either direction of drive, the ring being embraced between a V-channeled boss 20 formed on the head 11 of the shaft 10 and V-shaped flanges 21, 21 formed respectively on a pair of half-circle clamping members 22, 22 which are tightened upon the rubber ring by bolts 23, 23 and are secured to the head 13 of the shaft 12 by bolts 24, 24.

The rubber ring 19 can be made endless and stretched into place or can be made in sections, and the construction is such that with suitable relative dimensions it can be put under permanent compression or pre-loaded by the forcing home of the nuts on the bolts 23.

The container 15 preferably is of substantially the same construction as a pneumatic tire except that, for high lateral deformability and high strength against inflation pressure, it has been found desirable to reinforce it with only radially disposed cords, 15ᵃ.

This construction provides for economy of manufacture and simplicity of assembly. The thrust-sustaining ring 19 being of small diameter, it can compensate adequately for shaft misalignment without being subjected to excessive deformation or strain, and yet it is adapted to sustain heavy thrust in either direction without yielding more than enough to give a desirable cushioning effect.

Figure 3:
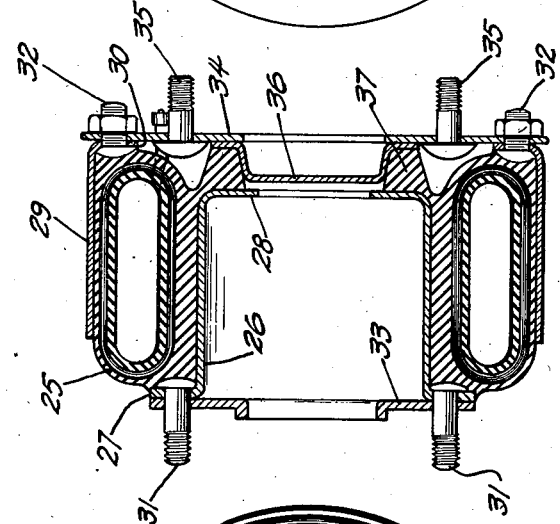
Fig. 3 is a longitudinal middle section of a flexible-coupling assembly embodying my invention in its preferred form as adapted for another manner of assembly.
Figure 4:
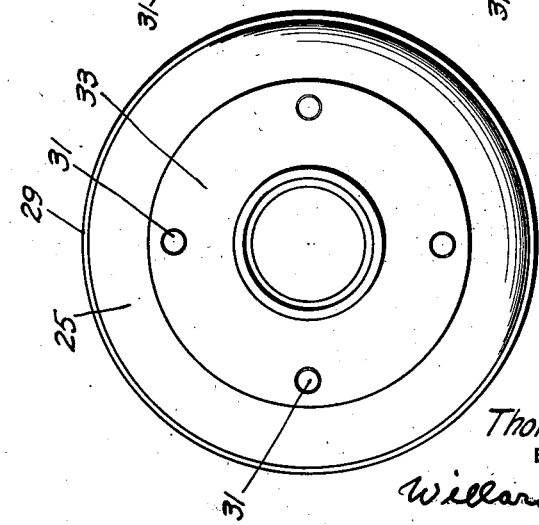
Fig. 4 is an elevation of the same from the left of Fig. 3.

In the modification shown in Figs. 3 to 5, the flexible, torque-transmitting fluid-container, 25, is vulcanized to an inner metal-stamping 26 having at its axially outer side an outwardly projecting radial attachment flange 27 and at its axially inner side an internal radial thrust-receiving flange 28.

The container also is vulcanized to an outer metal stamping 29 having at its axially outer side an inwardly extending attachment flange 30.

Thus the stampings 26, and 29 are the only metal parts requiring to be handled in the rubber factory.

Preferably this assembly is vulcanized with attachment bolts 31, 31 and 32, 32 in place in the attachment flanges 27 and 30, the bolts 31 being adapted to receive a closure plate 33 and the head (not shown) of a shaft, and the bolts 32 being adapted to receive a torque-transmitting and thrust-sustaining plate 34 adapted to be secured to the head of the other shaft by bolts 35, 35.

Welded to the plate 34 is a metal stamping 36 shaped to provide a center-boss to fit into an annular rubber thrust-ring portion 37 formed as a part of the fluid-container assembly, for transmitting thrust from one to the other of the two parts directly embracing it, which are the margin of the center-boss stamping 36 and the inwardly extending flange 28 of the stamping 26.

The construction is such that with suitable relative dimensions the rubber thrust-ring 37 can be put under permanent compression or pre-loaded by the forcing home of the nuts on the bolts 32.

In this embodiment, as well as in that of Figs. 1 and 2, the rubber thrust ring is preferably of relatively small diameter, so that it is not greatly deformed by angular shaft misalignment.

It will be manifest that the constructions shown and described provide in high degree the advantages that are indicated in the above statement of objects.

Further modifications are possible within the scope of the appended claims.

I claim:

1. A flexible coupling comprising a pair of coupled members, means at a relatively large distance from the axis of rotation for transmitting torque from one to the other of them, and a thrust-sustaining and substantially non-torque-transmitting assembly confined to a region closer to the axis of rotation than any part of the said torque-transmitting means and comprising thrust-transmitting means on the respective coupled members and a resiliently deformable means interposed operatively between the said thrust-transmitting means for cushioning of thrust in both directions.

2. A flexible coupling comprising a pair of coupled members, means at a relatively large distance from the axis of rotation for transmitting torque from one to the other of them, and a thrust-sustaining and substantially non-torque-transmitting assembly confined to a region closer to the axis of rotation than any part of the said torque-transmitting means and comprising thrust-transmitting means on the respective coupled members, one of said means comprising an externally channeled member and the other a plurality of clamping members, and resiliently deformable cushioning material interposed operatively between the two said means as to both directions of thrust.

3. A flexible coupling comprising a pair of coupled members, means at a relatively large distance from the axis of rotation for transmitting torque from one to the other of them, and a thrust-sustaining and substantially non-torque-transmitting assembly confined to a region closer to the axis of rotation than any part of the said torque-transmitting means and comprising thrust-transmitting means on the respective coupled members, one of said means comprising an externally channeled member and the other a plurality of clamping members, and resiliently deformable cushioning material interposed operatively between the two said means as to both directions of thrust, the cushioning material and the members embracing it being so formed with obliquely-disposed engagement faces that the said material is put under compression in an axial direction by being radially clamped.

4. A flexible coupling comprising a pair of coupled members, a flexible, torque-transmitting fluid-container for transmitting torque from one to the other of them, and resiliently deformable means interposed operatively between the coupled members for the cushioning of thrust, the torque-transmitting member and the thrust cushioning means comprising parts of a single molded article, inclusive of bolts for attaching it to the coupled members.

5. A flexible coupling comprising a driving member and a driven member, means at a relatively large distance from the axis of rotation adapted to transmit torque from the driving member to the driven member substantially without a component of the torque urging the said members toward each other or out of alignment, and pre-loaded thrust-cushioning means closer to the axis of rotation.

6. A flexible coupling comprising a driving member and a driven member, means at a relatively large distance from the axis of rotation adapted to transmit torque from the driving member to the driven member substantially without a component of the torque urging the said members toward each other or out of alignment, and pre-loaded thrust-cushioning means closer to the axis of rotation, the thrust-cushioning means comprising a thrust-cushion of resiliently deformable material.

7. A flexible coupling comprising a driving member and a driven member, means at a relatively large distance from the axis of rotation for transmitting substantially all of the torque from the driving member to the driven member and means closer to the axis of rotation for sustaining substantially all of the thrust as to both directions of thrust.

8. A flexible coupling comprising a driving member and a driven member, means at a relatively large distance from the axis of rotation for transmitting substantially all of the torque from the driving member to the driven member and resiliently deformable means closer to the axis of rotation for sustaining substantially all of the thrust as to both directions of thrust.

9. A flexible coupling comprising a pair of coupled members, an annular fluid-container having freely-flexing side-walls for transmitting torque at a relatively large distance from the axis of rotation and thrust-sustaining means closer to the axis of rotation.

10. A flexible coupling comprising a pair of coupled members, an annular fluid-container having freely-flexing side-walls for transmitting torque at a relatively large distance from the axis of rotation and thrust-cushioning means closer to the axis of rotation.

11. A flexible coupling comprising a pair of coupled members, an annular fluid-container having freely-flexing side-walls for transmitting torque at a relatively large distance from the axis of rotation and thrust-cushioning means closer to the axis of rotation and so formed and associated as to sustain the thrust in compression as to both directions of thrust.

12. A flexible coupling comprising a driving member and a driven member, means at a relatively large distance from the axis of rotation for transmitting substantially all of the torque from the driving member to the driven member and means closer to the axis of rotation for sustaining substantially all of the thrust in compression as to both directions of thrust.

THOMAS L. FAWICK.